US006507766B2

United States Patent
Khan

(10) Patent No.: US 6,507,766 B2
(45) Date of Patent: *Jan. 14, 2003

(54) METHOD FOR DEFINING SYSTEM HIERARCHY

(75) Inventor: Khan Mohamed Khirullah Genghis Khan, Schenectady, NY (US)

(73) Assignee: General Electric Company, Nishayuna, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/425,914

(22) Filed: Oct. 25, 1999

(65) Prior Publication Data

US 2002/0165624 A1 Nov. 7, 2002

(51) Int. Cl.[7] ............................ G06F 19/00; G01N 37/00
(52) U.S. Cl. ........................ 700/109; 700/97; 700/108; 702/84
(58) Field of Search .................. 700/51, 97, 108–110; 702/81, 84, 179, 182; 705/7; 703/1, 2

(56) References Cited

U.S. PATENT DOCUMENTS

| | | | | |
|---|---|---|---|---|
| 5,278,751 A | * | 1/1994 | Adiano et al. ................. | 705/10 |
| 5,745,390 A | * | 4/1998 | Daneshgari .................. | 702/119 |
| 5,765,137 A | * | 6/1998 | Lee ................................. | 705/7 |
| 5,963,910 A | * | 10/1999 | Ulwick ........................... | 705/7 |
| 6,253,115 B1 | * | 6/2001 | Martin et al. ................... | 700/97 |
| 6,301,516 B1 | * | 10/2001 | Ostrowski et al. .......... | 700/109 |
| 6,377,908 B1 | * | 4/2002 | Ostrowski et al. ............. | 703/2 |

OTHER PUBLICATIONS

The House of Quality, Harvard Business Review, May–Jun. 1988.
Copending U.S. patent application Ser. No. 09/312,690, filed May 14, 1999, by M. A. Ali et al., entitled "Method for Quality Function Deployment".
Copending U.S. patent application Ser. No. 09275,985, filed Mar. 25, 1999, by M. C. Ostrowski et al., entitled "Method for Identifying Critical to Quality Dependencies".

* cited by examiner

*Primary Examiner*—Leo Picard
*Assistant Examiner*—Ryan Jarrett
(74) *Attorney, Agent, or Firm*—Patrick K. Patnode; Christian G. Cabou

(57) ABSTRACT

An exemplary embodiment of the invention is directed to a method for defining a system hierarchy for a system including a plurality of variables. The method includes generating a first level system block corresponding to a first variable at a first level of the system hierarchy. The first level system block includes statistical information related to the first variable. A second level system block is generated corresponding to a second variable at a second level of the system hierarchy. The second variable has an effect on a value of the first variable. The second level system block includes statistical information related to the second variable.

20 Claims, 5 Drawing Sheets

METHOD FOR DEFINING SYSTEM HIERARCHY

BACKGROUND OF THE INVENTION

The invention relates to a method for defining a hierarchy for a system. A system can be represented in a hierarchical fashion from a system level to a subsystem level to a component level, etc. At each level, critical to quality (CTQ) parameters may be defined which represent aspects of the system that are important to meeting various metrics (performance, customer satisfaction, etc.). The concept of "houses of quality" has been used to represent the decomposition of higher level requirements such as critical to quality parameters or CTQ's into lower level critical to quality parameters such as key control parameters or KCP's. FIG. 1 depicts a conventional house of quality hierarchy in which high level requirements such as customer requirements are decomposed into lower level characteristics such as key manufacturing processes and key process variables within the manufacturing processes. This hierarchy can also be applied to system design instead of manufacturing to relate system level critical to quality parameters to subsystem critical to quality parameters. For example, in a projector, a system level CTQ parameter may be image quality, which may depend on sub-system level CTQ parameters such a lamp intensity. While the existing hierarchical system representations are useful, it is understood that improvements to such representations are needed.

BRIEF SUMMARY OF THE INVENTION

An exemplary embodiment of the invention is directed to a method for defining a system hierarchy for a system including a plurality of variables. The method includes generating a first level system block corresponding to a first variable at a first level of the system hierarchy. The first level system block includes statistical information related to the first variable. A second level system block is generated corresponding to a second variable at a second level of the system hierarchy. The second variable has an effect on a value of the first variable. The second level system block includes statistical information related to the second variable.

DETAILED DESCRIPTION OF THE INVENTION

Figure 1:
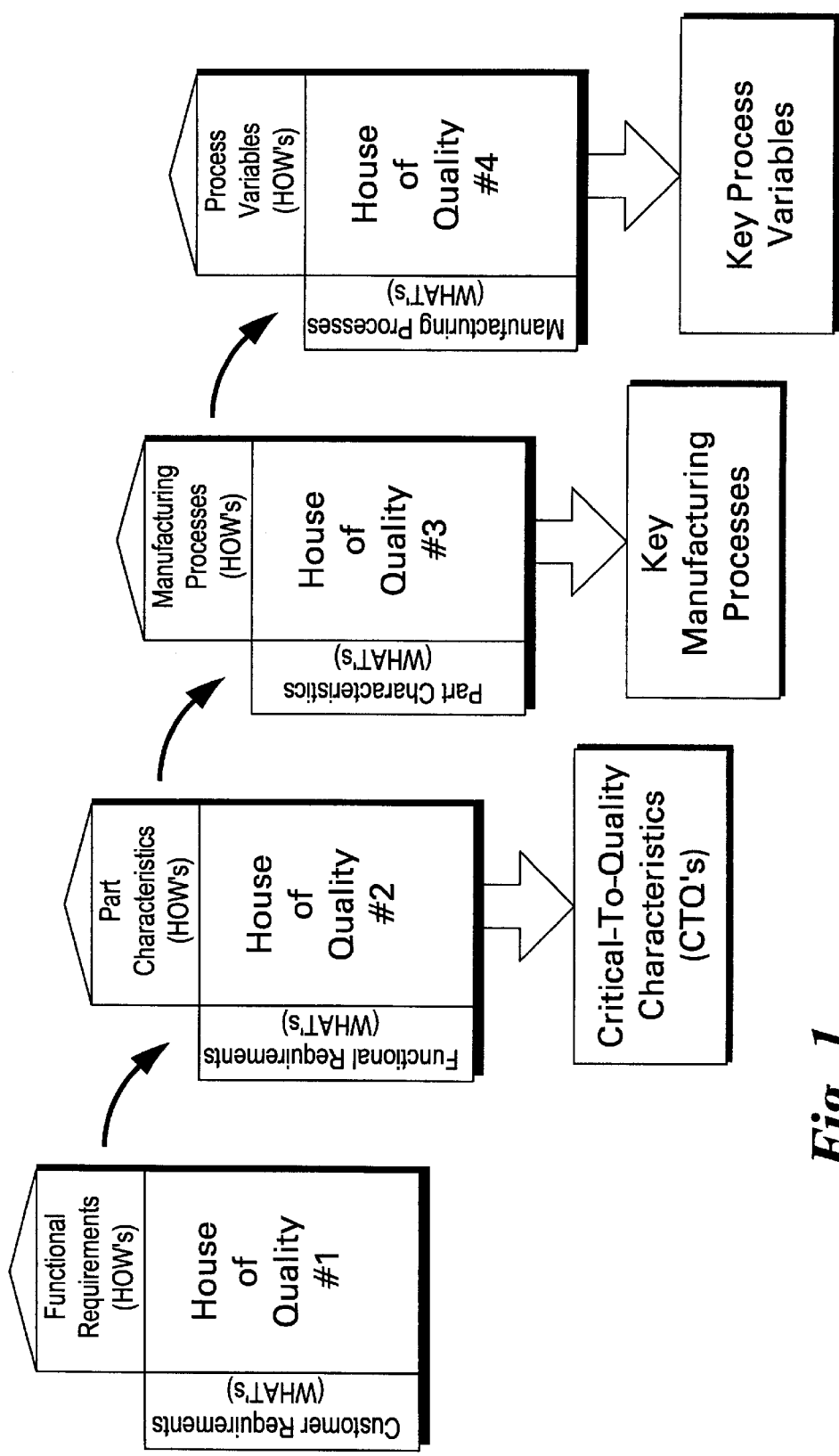
FIG. 1 depicts a conventional, hierarchical representation of a system.
Figure 2:
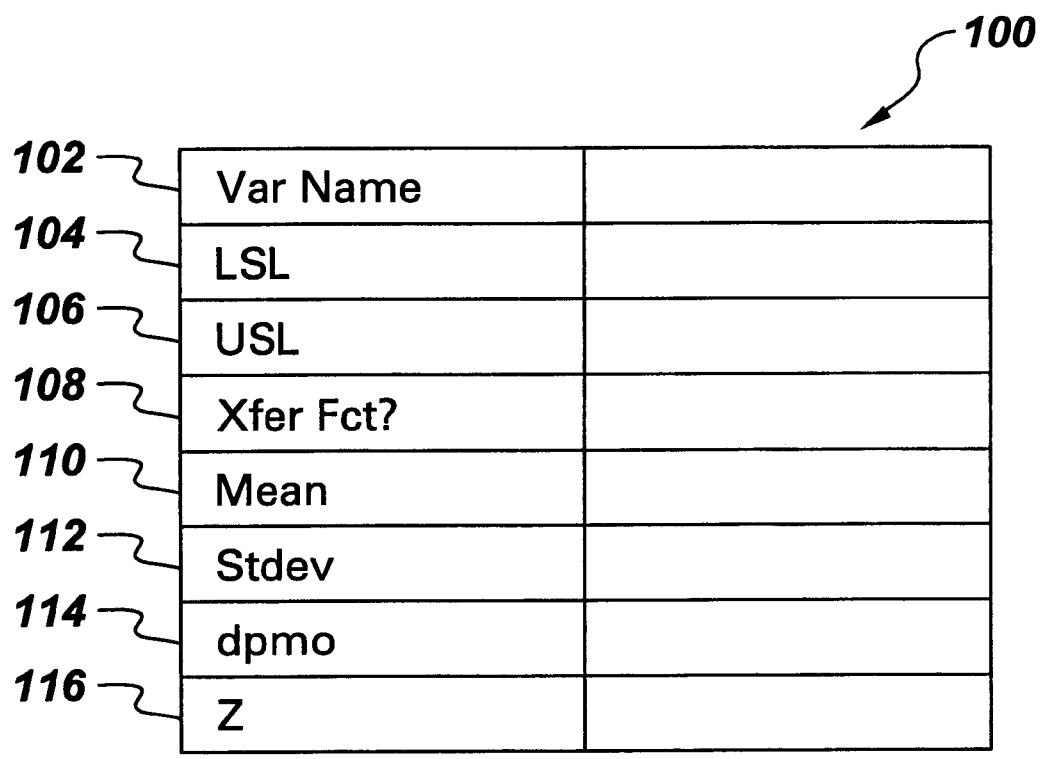
FIG. 2 depicts a system block.

An exemplary embodiment of the invention is a method and system of defining a system hierarchy which provides structural information in the form of a hierarchy but also provides statistical information at each level of the hierarchy. An exemplary embodiment of the invention may be used to present information concerning critical to quality (CTQ) parameters in a design for six sigma (DFSS) process and simultaneously provide statistical information concerning each CTQ parameter. The hierarchy is formed through a number of system blocks 100 shown in FIG. 2. As shown in FIG. 2, the system block 100 contains statistical information regarding a particular variable. The system block 100 provides a tool for the user to input information concerning variables in the hierarchy. As described in more detail herein, the system may be implemented on a general purpose computer in which the user would enter data in system block 100 through a conventional user interface.

A first field in the system block 100 is a variable name field 102 shown as Var Name. The variable name field is a text string containing the name of the design variable. The variable may be a critical to quality (CTQ) parameter as used in a design for six sigma (DFSS) process. The parameter lower specified limit field 104 shown as LSL and the parameters upper specified limit field 106 shown as USL define the permissible range of values for the variable. If the variable value exceeds the lower spec limit or the upper spec limit, this is considered a defect. A transfer function field 108 shown as Xfer Fct? is a field in which the user can specify a formula denoting the relationship between the value of the variable in the system block 100 and other variables. If no transfer function exists for the variable, then the transfer function field is left empty.

A parameter mean field 110 contains a mean value for the variable and may be a number or a formula for computing the mean value of this variable. This calculation may be based on the linear, quadratic or any order propagation of errors technique which would be updated constantly. A parameter standard deviation field 112 shown as Stdev may be a number or a formula for computing the standard deviation of this variable. This calculation may be based on the linear, quadratic or any order propagation of errors technique which would be updated constantly. A defects per million opportunities field 114 shown as dpmo is a calculation of the number of times the variable exceeds either the lower spec limit in field 104 or the upper spec limit in field 106. A Z field 116 includes the sigma value Z score for the variable which is a notation used in the DFSS process to indicate how well the variable meets design criteria. The Z score is related to the defects per million opportunities field 114 and may be a short term Z score or long term Z score depending on the preferences of the user. Another field (not shown) which may be included in the system block 100 is a number of opportunities field which designates the number of times a variable occurs in a design. For example, if the variable relates to bolt tension, the number of opportunities field would indicate the number of bolts in the design.

Figure 3:
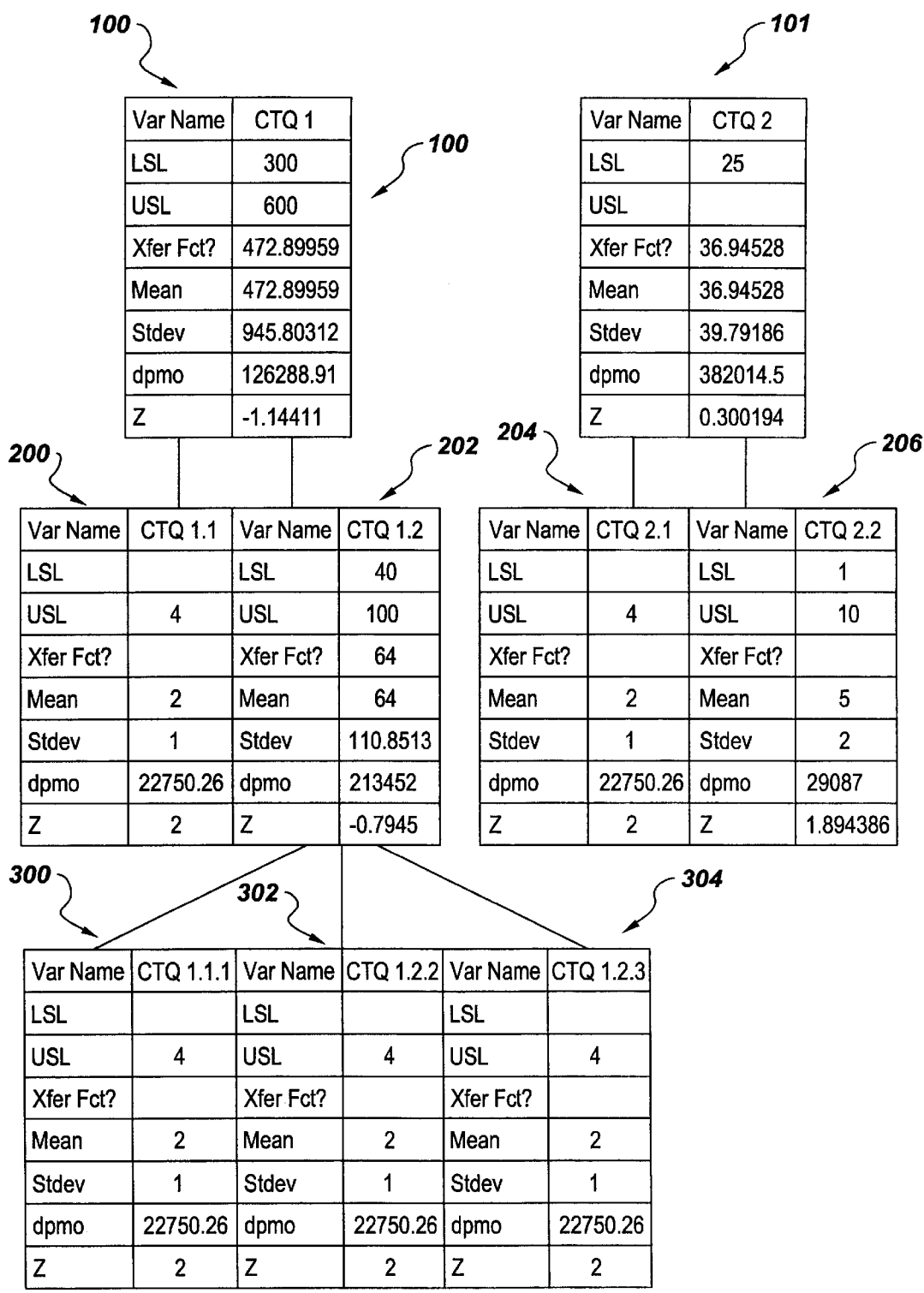
FIG. 3 depicts a system hierarchy in an exemplary embodiment.

FIG. 3 shows a system hierarchy constructed using system blocks. To create the system hierarchy of FIG. 3, the user first creates top level system blocks 100 and 101. These top level system blocks are directed to critical to quality parameters shown as CTQ 1 and CTQ 2. As described above, the user completes the fields in the each system block through a user interface. The system block may include features to facilitate insertion of data into certain fields. For example, the Z field may include a drop down menu that allows the user to select either a long term or short term Z computation. Adding formula or equations for defining transfer functions is described below with reference to FIG. 4.

Once a top level system block is created, the user may select to add lower level or sibling system blocks from an existing system block. As shown in FIG. 3, two lower level system blocks 200 and 202 have been designated off system block 100 and two lower level system blocks 204 and 206 have been designated off system block 101. This indicates that variable CTQ 1 in top level system block 100 is effected by variables CTQ 1.1 and CTQ 1.2 in lower level system blocks 200 and 202. For example, if the entire system is a projector, CTQ 1 may be the image quality and CTQ 1.1 and CTQ 1.2 may be lamp focal spot and lamp brightness. The statistical data fields in lower level system blocks 200–206 are completed by the user as described above. Similarly, subsequent lower level system blocks may be added as necessary. As shown in FIG. 3, additional lower level system blocks 300, 302 and 304 have been created off system block 202. This indicates that variable CTQ 1.2 is effected by variables CTQ 1.2.1, CTQ 1.2.2 and CTQ 1.2.3. In the projector system example, CTQ 1.2.1, 1.2.2 and 1.2.3 may be variables that effect lamp brightness such as filament centering, filament diameter and filament intensity.

Figure 4:
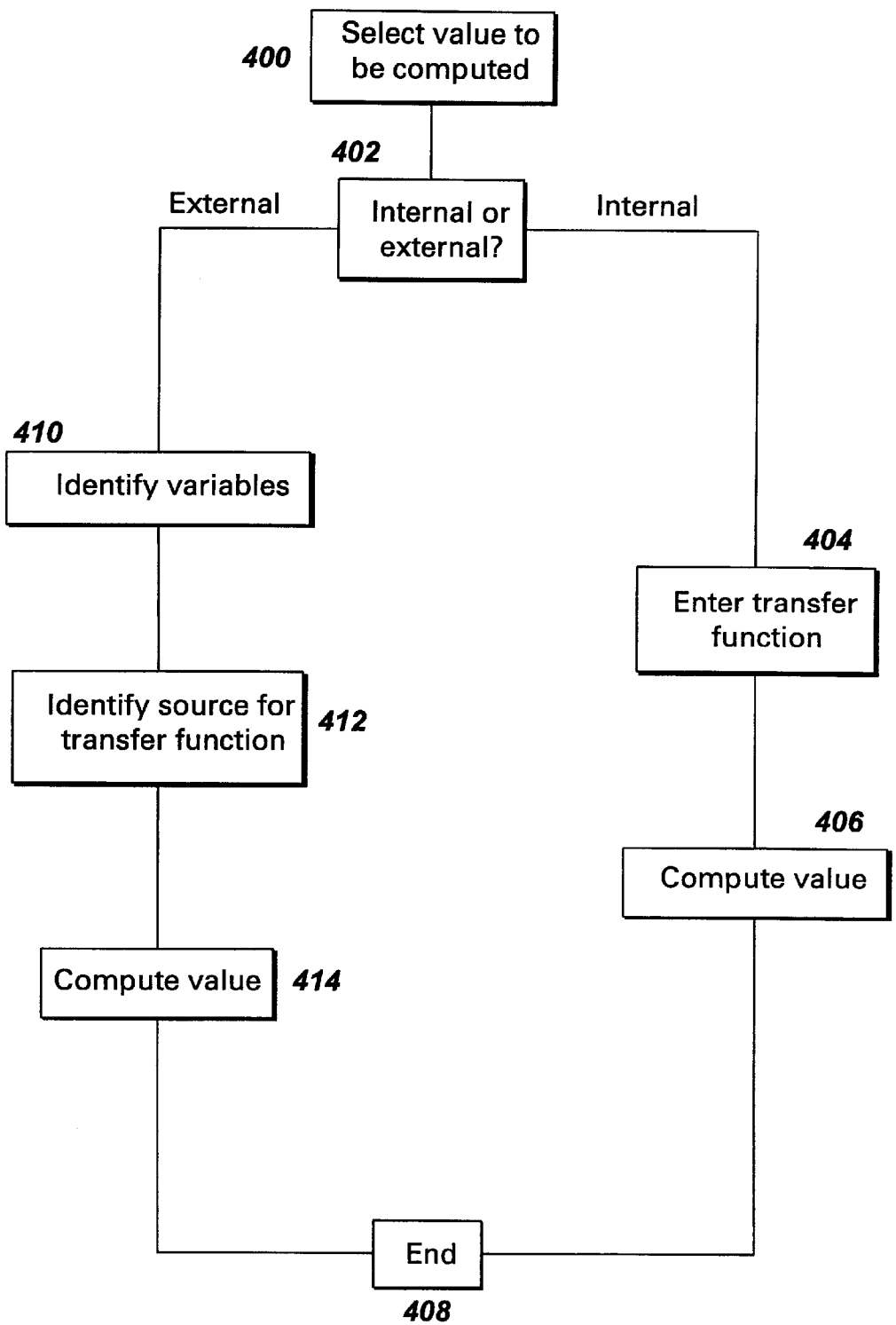
FIG. 4 is a flowchart of the process of creating a transfer function.

FIG. 4 is a flowchart depicting a process of defining a transfer function to compute a value for a variable. As described above, each system block includes a transfer function field which can be used to define a value (e.g., y) in terms of one or more other variables (e.g., x's). As shown in FIG. 4, the first step 400 is to select a value for which the user desires to generate a transfer function. This may be done by selecting the transfer function field 108 for a particular variable or through menus. At step 402, the user designates whether the transfer function will be internal to the system hierarchy or external. In an exemplary embodiment, the invention is implemented using a spreadsheet program. If the transfer function for a value relies on equations built into the spreadsheet and uses variables available in the current spreadsheet, than an internal transfer function is generated. If the transfer function must call on other resources (e.g., a computation engine or tool that implements a desired function), then an external transfer function is generated.

If the user designates an internal transfer function, flow proceeds to step 404 where the user enters the transfer function relating the value to one or more variables in the system hierarchy. The system computes the value for the desired variable based on the transfer function at step 406 and flow proceeds to step 408 where the routine ends.

If the user designates an external transfer function at step 402, flow proceeds to step 410 where the user identifies the variables or x's from the current system hierarchy that will be used to define the value or y. At step 412, the user designates the source for the external transfer function. This may be a cell in an external spreadsheet that computes the value based on the variables. In addition, the user may specify more complex calculations such as standard deviation or mean of the value, in which case the user would have to provide information such as the standard deviation of the variables to the external transfer function. At step 414, the value is determined by sending the variables to the external transfer function and returning the value. Once the value for the current variable is returned, flow proceeds to step 408 where the process ends.

Figure 5:
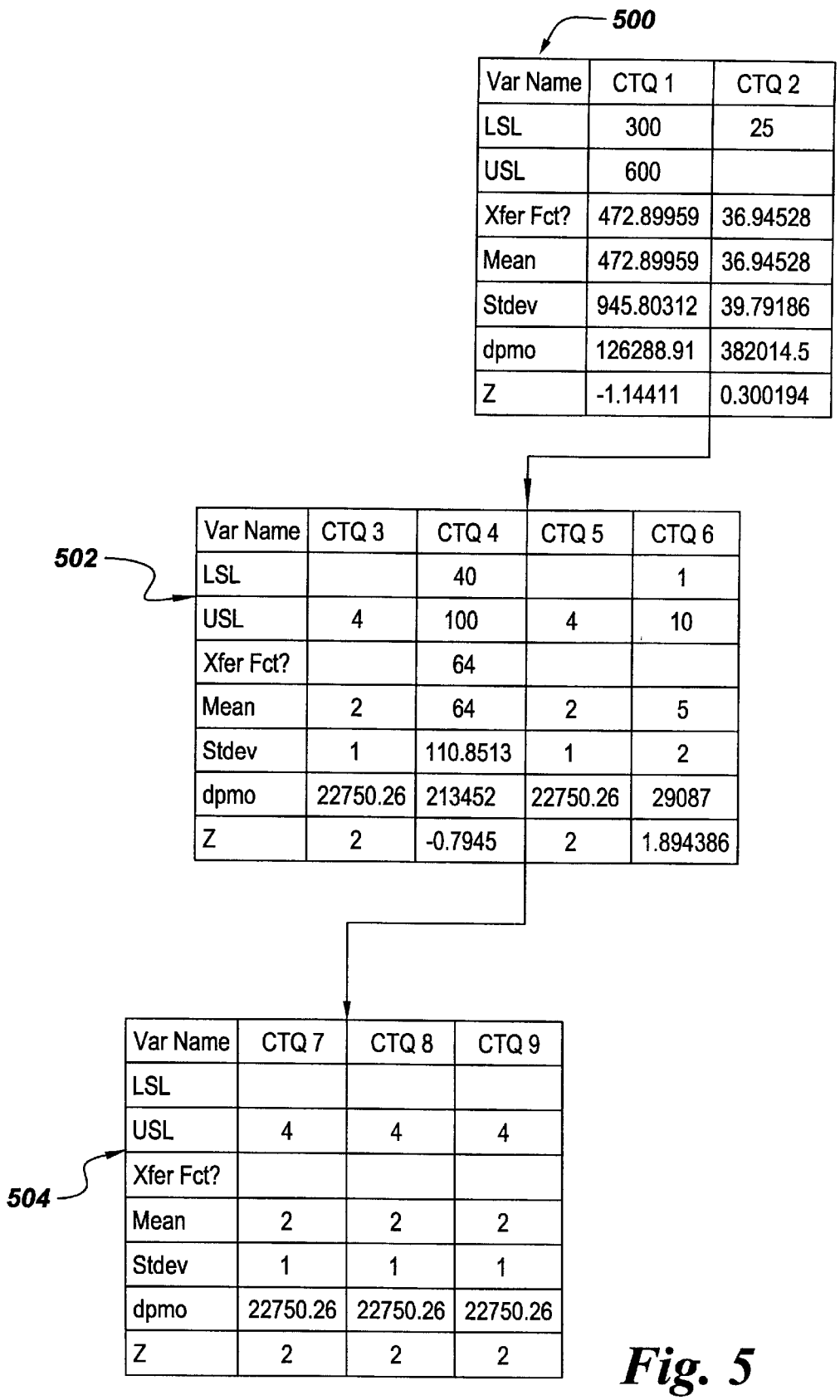
FIG. 5 depicts a system hierarchy in an alternative embodiment.

The system hierarchy may also be presented as shown in FIG. 5. In this embodiment, the system blocks at each level of the hierarchy are not separate as shown in FIG. 3. FIG. 5 includes a top level system block 500, a subsequent level system block 502 off top level system block 500 and subsequent level system block 504 off system block 502. The varying levels of system blocks may correspond to levels of a physical system. For example, the top level may include system variables, the second level may include assembly variables and the lower level may include component variables. In the embodiment shown in FIG. 5, the relationship between the variables from one level to the next is not readily apparent. For example, it is not apparent which variables in system block 502 effect variables in system block 500.

An exemplary embodiment of the invention provides a mechanism for depicting the relationship between variables across the system blocks 500, 502 and 504. To detect dependencies across multiple system blocks, the user selects a variable and instructs the system to identify dependencies. This may be done through a conventional user interface in which the user selects the variable and the selects an action from a pull down menu. The system then displays the selected variable, variables having an effect on the selected variable and variables effected by the selected variable in a common manner. In an exemplary embodiment, the selected variable, the variables having an effect on the selected variable and variables effected by the selected variable may be displayed highlighted in a common color. The user may select a variable at any level of the system hierarchy. For example, the user may select CTQ 1 and request an identification of variables effecting CTQ1. CTQ 1 and all variables effecting CTQ1 would then be highlighted in a common color. Alternatively, the user may select CTQ4 from system block 502 and variable CTQ4, variables effected by CTQ 4 in system block 500 and variables effecting CTQ4 in system block 504 will all be displayed in a common color. If multiple groups of related variables are displayed, then each is displayed in a different format (e.g., different color).

Both the embodiment shown in FIG. 3 and the embodiment shown in FIG. 5 include the ability to recompute the statistical fields upon changes in other variables. For example, in FIG. 3, if the mean value of CTQ 1.2.3. changes, the values in system block 202 and 100 should be updated as necessary. The computation may be performed in multiple ways. First, the user can request that all variables be updated. All statistical fields in the system blocks are updated. The user can also specify that a specific variable be updated. This may be useful when the user knows that only one variable has been effected by a change in the hierarchy and thus it is not necessary to waste time and system resources recomputing the statistical values for every variable. Lastly, the system may automatically update variables when a change is detected in a variable. Since the relationship between variables is known through transfer functions, the system can automatically detect a change in a variable and then determine the effect of this change on other variables. Only variables effected by the change need to be updated.

As described above, the exemplary embodiments of the invention may be implemented using a general purpose computer programmed to carry out the steps described herein. The user interacts with the general purpose computer through a user interface which allows for entering data and designating process steps to be performed by the general purpose computer. The exemplary embodiments of the invention may be used in a variety of applications including defining a hierarchy for CTQ parameters in processes to be improved with six sigma methodology. Such processes include design processes (e.g., development of parameters to provide desired performance); manufacturing processes (e.g., improving the production process for an item); and command processes (e.g., improving processes for handling business transactions).

The invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for defining a system hierarchy for a system including a plurality of variables, the method comprising:

generating a first level system block corresponding to a first variable at a first level of the system hierarchy, said first level system block including statistical information related to said first variable;

generating a second level system block corresponding to a second variable at a second level of the system hierarchy, said second level system block including statistical information related to said second variable, said second variable having an effect on a value of said first variable;

selecting a variable from a system block to define a selected variable; and displaying said selected variable, variables effecting said selected variable and variables effected by said selected variable in a common format;

wherein said statistical information includes defects per million opportunities.

2. The method of claim 1 wherein:

said first variable and said second variable are critical to quality parameters.

3. The method of claim 2 wherein:

the system represents a product design.

4. The method of claim 2 wherein the system represents a manufacturing or commercial process.

5. The method of claim 1 wherein said statistical information includes a parameter lower specified limit value and a parameter upper specified limit value.

6. The method of claim 1 wherein said statistical information includes a mean value.

7. The method of claim 1 wherein said statistical information includes a parameter standard deviation value.

8. The method of claim 1 wherein said statistical information includes a sigma value Z score.

9. The method of claim 1 wherein said first system block includes a transfer function defining an equation for calculating a value for said first variable.

10. The method of claim 1 wherein said common format is highlighting in a single color.

11. A storage medium encoded with machine-readable computer program code for defining a system hierarchy for a system including a plurality of variables, the storage medium including instructions for causing a computer to implement a method comprising:

generating a first level system block corresponding to a first variable at a first level of the system hierarchy, said first level system block including statistical information related to said first variable;

generating a second level system block corresponding to a second variable at a second level of the system hierarchy, said second level system block including statistical information related to said second variable, said second variable having an effect on a value of said first variable;

selecting a variable from a system block to define a selected variable; and displaying said selected variable, variables effecting said selected variable and variables effected by said selected variable in a common format;

wherein said statistical information includes defects per million opportunities.

12. The storage medium of claim 11 wherein said first variable and said second variable are critical to quality parameters.

13. The storage medium of claim 12 wherein the system represents a product design.

14. The storage medium of claim 12 wherein the system represents a manufacturing or commercial process.

15. The storage medium of claim 11 wherein said statistical information includes a parameter lower specified limit and a parameter upper specified limit.

16. The storage medium of claim 11 wherein said statistical information includes a parameter mean.

17. The storage medium of claim 11 wherein said statistical information includes a parameter standard deviation.

18. The storage medium of claim 11 wherein said statistical information includes a sigma value Z score.

19. The storage medium of claim 11 wherein said first system block includes a transfer function defining an equation for calculating a value for said first variable.

20. The storage medium of claim 11 wherein said common format is highlighting in a single color.

* * * * *